(12) United States Patent
Kancharla et al.

(10) Patent No.: US 10,691,496 B2
(45) Date of Patent: Jun. 23, 2020

(54) DYNAMIC MICRO-SERVICES RELATED JOB ASSIGNMENT

(71) Applicant: Capital One Services, LLC, McLean, VA (US)

(72) Inventors: Gopi Kancharla, Frisco, TX (US); Krishna Mellacheruvu, Murphy, TX (US); Kush Patel, Austin, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/390,417

(22) Filed: Apr. 22, 2019

(65) Prior Publication Data

US 2019/0310890 A1    Oct. 10, 2019

Related U.S. Application Data

(63) Continuation of application No. 15/947,496, filed on Apr. 6, 2018, now Pat. No. 10,310,906.

(51) Int. Cl.
*G06F 15/16* (2006.01)
*G06F 9/50* (2006.01)
*G06F 9/54* (2006.01)
*G06F 9/48* (2006.01)

(52) U.S. Cl.
CPC .......... *G06F 9/5038* (2013.01); *G06F 9/4887* (2013.01); *G06F 9/5055* (2013.01); *G06F 9/5061* (2013.01); *G06F 9/546* (2013.01)

(58) Field of Classification Search
CPC .... G06F 9/4887; G06F 9/5055; G06F 9/5061; G06F 9/546
See application file for complete search history.

(56) References Cited

U.S. PATENT DOCUMENTS

| | | |
|---|---|---|
| 6,763,519 B1 | 7/2004 | McColl et al. |
| 7,287,180 B1 | 10/2007 | Chen et al. |
| 7,613,848 B2 | 11/2009 | Amini et al. |
| 8,194,690 B1 | 6/2012 | Steele et al. |
| 8,230,110 B2 | 7/2012 | Vegesna et al. |
| 8,442,230 B1* | 5/2013 | Ng ........................ H04L 43/10 380/260 |
| 8,694,639 B1* | 4/2014 | Vermeulen ............ G06F 9/5011 709/226 |

(Continued)

OTHER PUBLICATIONS

Co-pending U.S. Appl. No. 15/947,496, filed Apr. 6, 2018.

*Primary Examiner* — Ryan J Jakovic
(74) *Attorney, Agent, or Firm* — Harrity & Harrity, LLP

(57) ABSTRACT

A device may receive a set of heartbeat messages. The set of heartbeat messages may be related to determining a respective priority of a set of computing nodes for processing a set of jobs. The device may identify a heartbeat message, of the set of heartbeat messages, associated with a lowest offset relative to offsets associated with other heartbeat messages of the set of heartbeat messages. The device may determine the respective priority of the set of computing nodes based on one or more factors related to the set of computing nodes or the set of heartbeat messages. The device may determine whether to perform a subset of the set of jobs based on the respective priority of the set of computing nodes. The device may perform a set of actions after determining whether to perform the subset of the set of jobs.

20 Claims, 4 Drawing Sheets

(56) References Cited

U.S. PATENT DOCUMENTS

| | | | |
|---|---|---|---|
| 2006/0190948 A1* | 8/2006 | Burger | G06F 9/546 |
| | | | 719/314 |
| 2007/0211280 A1 | 9/2007 | Bansal et al. | |
| 2007/0299980 A1 | 12/2007 | Amini et al. | |
| 2008/0253283 A1 | 10/2008 | Douglis et al. | |
| 2008/0256384 A1 | 10/2008 | Branson et al. | |
| 2014/0006534 A1* | 1/2014 | Jain | G06F 9/5094 |
| | | | 709/208 |
| 2016/0088319 A1 | 3/2016 | Zucchetta et al. | |
| 2018/0181471 A1* | 6/2018 | Panta | G06F 11/1076 |

* cited by examiner

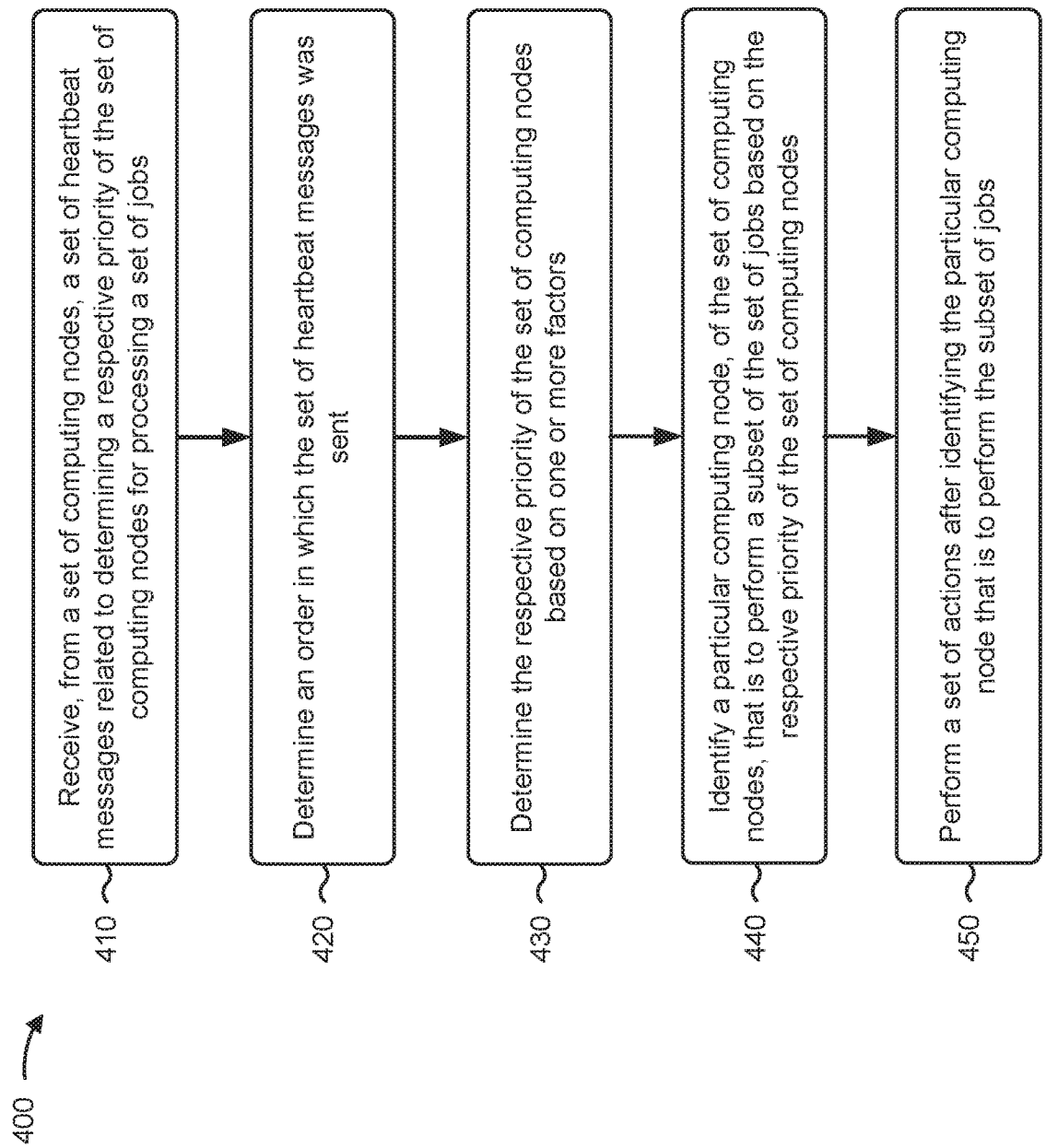

US 10,691,496 B2

DYNAMIC MICRO-SERVICES RELATED JOB ASSIGNMENT

RELATED APPLICATION

This application is a continuation of U.S. patent application Ser. No. 15/947,496, filed Apr. 6, 2018, which is incorporated herein by reference.

BACKGROUND

Micro-services is a variant of the service-oriented architecture that structures an application as a collection of related services. A micro-service architecture may utilize a modular structure for easier development and/or testing. Services in a micro-services architecture may communicate with each other to fulfill a goal and/or to produce an output from a system.

SUMMARY

According to some possible implementations, a method may include receiving, by a computing node and from a set of computing nodes, a set of heartbeat messages. The set of heartbeat messages may be related to determining a respective priority of the set of computing nodes for processing a set of jobs. The set of computing nodes may include the computing node. The method may include identifying, by the computing node, a heartbeat message, of the set of heartbeat messages, associated with a lowest offset relative to offsets associated with other heartbeat messages of the set of heartbeat messages. The method may include determining, by the computing node, the respective priority of the set of computing nodes based on one or more factors related to the set of computing nodes or the set of heartbeat messages. The one or more factors may include a respective offset associated with the set of heartbeat messages, a respective version of software installed on the set of computing nodes, and a respective computing resource utilization of the set of computing nodes. The method may include determining, by the computing node, whether to perform a subset of the set of jobs based on the respective priority of the set of computing nodes. The method may include performing, by the computing node, a set of actions after determining whether to perform the subset of the set of jobs.

According to some possible implementations, a computing node may include one or more memories; and one or more processors, communicatively coupled to the one or more memories, configured to receive, from a set of computing nodes, a set of heartbeat messages. The set of heartbeat messages may be related to determining a respective priority of the set of computing nodes for processing a set of jobs. The set of computing nodes may include the computing node. The one or more processors may store the set of heartbeat messages in temporary memory resources associated with the computing node after receiving the set of heartbeat messages. The one or more processors may identify a heartbeat message, of the set of heartbeat messages, associated with a lowest offset relative to other offsets associated with other heartbeat messages, of the set of heartbeat messages, after storing the set of heartbeat messages. The one or more processors may determine the respective priority of the set of computing nodes based on one or more factors related to the set of computing nodes or the set of heartbeat messages. The one or more factors may include a respective offset associated with the set of heartbeat messages. The one or more processors may determine whether the computing node is to perform a subset of the set of jobs based on the respective priority of the set of computing nodes. The one or more processors may delete the set of heartbeat messages from the temporary memory resources after determining whether to perform the subset of the set of jobs. The one or more processors may perform a set of actions after determining whether to perform the subset of the set of jobs.

According to some possible implementations, a non-transitory computer-readable medium may store one or more instructions that, when executed by one or more processors, cause the one or more processors to receive a set of heartbeat messages from a set of computing nodes. The set of heartbeat messages may be related to determining a respective priority of the set of computing nodes for processing a set of jobs. The one or more instructions, when executed by the one or more processors, may cause the one or more processors to identify a heartbeat message, of the set of heartbeat messages, associated with a lowest offset relative to other offsets associated with other heartbeat messages, of the set of heartbeat messages, based on a clock or a respective timestamp for the set of heartbeat messages. The one or more instructions, when executed by the one or more processors, may cause the one or more processors to store the set of heartbeat messages in temporary memory resources of a computing node of the set of computing nodes. The set of heartbeat messages may be stored based on a respective offset associated with the set of heartbeat messages. The one or more instructions, when executed by the one or more processors, may cause the one or more processors to determine the respective priority of the set of computing nodes based on one or more factors related to the set of heartbeat messages or the set of computing nodes after storing the set of heartbeat messages.

The one or more instructions, when executed by the one or more processors, may cause the one or more processors to determine whether the computing node is to perform a subset of the set of jobs based on the respective priority of the set of computing nodes. The one or more instructions, when executed by the one or more processors, may cause the one or more processors to delete the set of heartbeat messages from the temporary memory resources of the computing node after determining whether the computing node is to perform the subset of the set of jobs. The one or more instructions, when executed by the one or more processors, may cause the one or more processors to perform a set of actions after deleting the set of heartbeat messages.

BRIEF DESCRIPTION OF THE DRAWINGS

FIG. 4 is a flow chart of an example process for dynamic micro-services related job assignment.

DETAILED DESCRIPTION

The following detailed description of example implementations refers to the accompanying drawings. The same reference numbers in different drawings may identify the same or similar elements.

Various micro-services may be coordinated to generate an output. For example, various micro-services related to processing a loan application may be coordinated to determine whether the loan application is accepted, is rejected, is escalated to an individual for further review, and/or the like. In a micro-services architecture, a set of computing nodes (e.g., server devices, user devices, and/or the like) may perform jobs related to the micro-services to generate output for the micro-services. If multiple computing nodes perform the same job to generate the same output, this wastes significant computing resources of the computing nodes, wastes network resources (e.g., bandwidth) of a network that is used to provide the output to a destination device, delays processing of other jobs, and/or the like.

Some implementations described herein provide a computing node that can use heartbeat messages exchanged among computing nodes of a micro-services architecture to determine a status of the computing nodes and/or to determine a priority for performing jobs related to micro-services. In this way, the computing node can dynamically determine whether to perform a particular job in a manner that is consistent with the manner in which other computing nodes determine whether to perform the particular job. This reduces or eliminates duplicative job performance by computing nodes, thereby improving job completion. In addition, this conserves processing resources of the computing nodes by reducing or eliminating duplicative job performance. Further, this reduces or eliminates overloading of a computing node, thereby improving functioning of the computing node. Further, this facilitates quick and efficient assignment of jobs among computing nodes, thereby improving functioning of the computing nodes using less network throughput.

Figure 1:
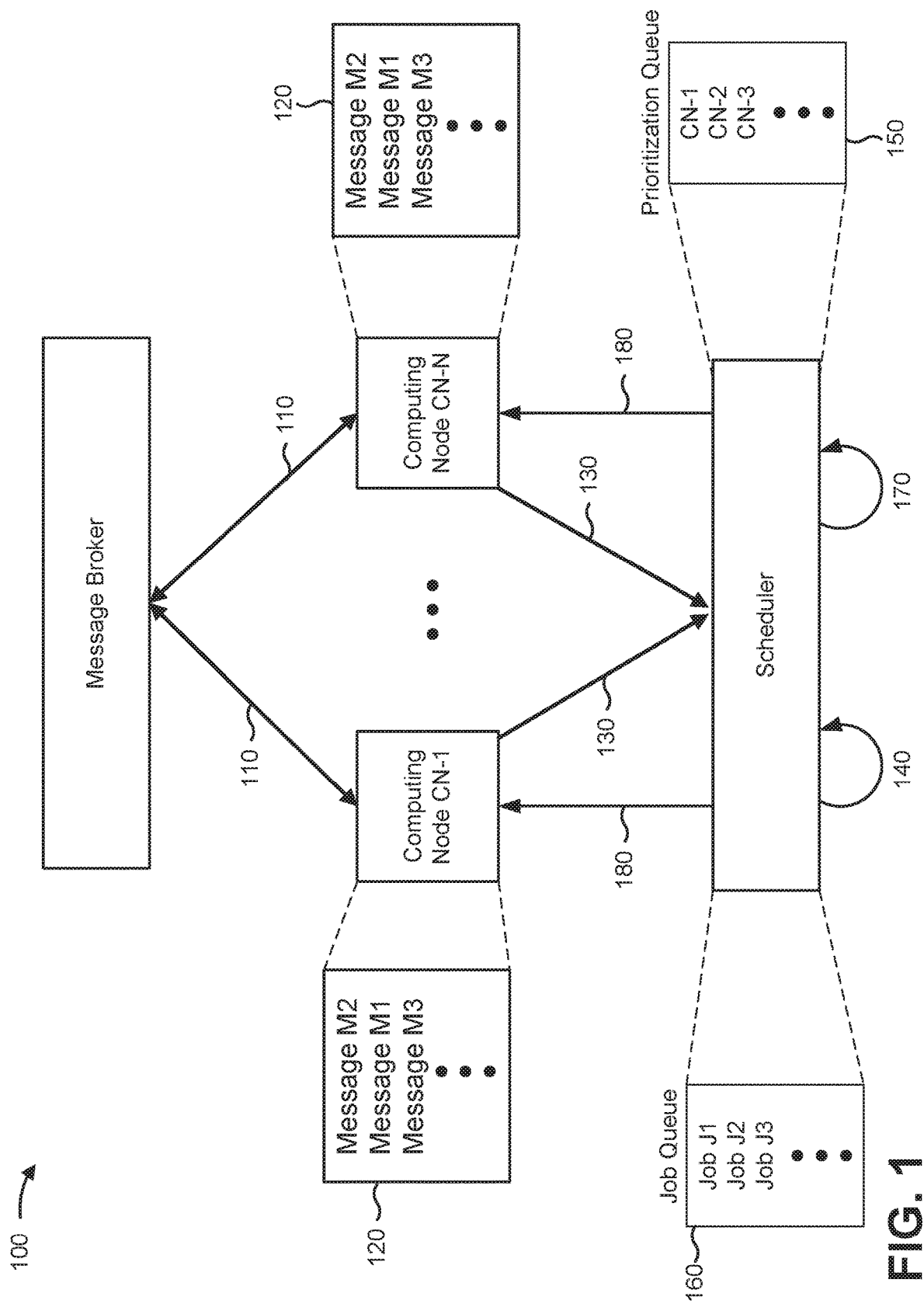
FIG. 1 is a diagram of an overview of an example implementation described herein.

FIG. 1 is a diagram of an overview of an example implementation 100 described herein. As shown in FIG. 1, implementation 100 includes a message broker (e.g., Kafka®), multiple computing nodes CN-1 through CN-N (e.g., where N is greater than or equal to 2), and a scheduler. In some implementations, computing nodes CN-1 through CN-N may be grouped into a computing cluster (e.g., a set of computing nodes associated with the same application, associated with related micro-services, and/or the like). In some implementations, the scheduler may be implemented on the computing nodes and the message broker may be implemented as a separate application, device, and/or the like. In some implementations, the message broker and the scheduler may be separate devices from the computing nodes. Alternatively, the message broker and the scheduler may be implemented on the computing nodes. In some implementations, the computing nodes may be configured to perform various jobs related to a set of micro-services.

As shown by reference numbers 110, computing nodes CN-1 through CN-N may exchange heartbeat messages via the message broker. For example, computing nodes CN-1 through CN-N may be subscribed to a message stream of the message broker associated with the heartbeat messages. Continuing with the previous example, computing nodes CN-1 through CN-N may publish respective heartbeat messages to the message stream and computing nodes CN-1 through CN-N may receive the respective heartbeat messages based on being subscribed to the message stream. In some implementations, a heartbeat message may include information related to a computing node, processing of a job by the computing node, and/or the like. For example, the heartbeat message may include information that identifies the computing node that provided the heartbeat message, an application hosted on the computing node, a version of software installed on the computing node, a status of the computing node (e.g., actively processing a job, idle, and/or the like), an amount of computing resources of the computing node being consumed by processing a job, and/or the like.

In some implementations, computing nodes CN-1 through CN-N may be configured with respective clocks that are synchronized to the same time (or within a threshold amount of time of each other). In some implementations, based on a time indicated by the respective clocks, computing nodes CN-1 through CN-N may exchange the heartbeat messages at an interval, at a set of pre-determined times, based on input from a user of a user device (not shown in FIG. 1), and/or the like. For example, computing nodes CN-1 through CN-N may publish respective heartbeat messages to a message stream associated with the message broker every 20 seconds, every 30 seconds, every minute, ten times per hour, and/or the like. In some implementations, computing nodes CN-1 through CN-N may record a time, using the respective clocks, for when the respective heartbeat messages were published to the message stream relative to a time when computing nodes CN-1 through CN-N were triggered to publish the heartbeat messages (e.g., in memory resources associated with computing nodes CN-1 through CN-N). In other words, computing nodes CN-1 through CN-N may record information that identifies respective amounts of delay between when computing nodes CN-1 through CN-N were triggered to publish the respective heartbeat messages and when computing nodes CN-1 through CN-N actually published the respective heartbeat messages to the message stream of the message broker. Computing nodes CN-1 through CN-N may use this information to determine a priority of computing nodes CN-1 through CN-N, as described in more detail elsewhere herein.

In some implementations, computing nodes CN-1 through CN-N may, based on receiving the respective heartbeat messages from each other, monitor which computing nodes are included in computing nodes CN-1 through CN-N. For example, computing nodes CN-1 through CN-N may determine whether a particular computing node previously included in computing nodes CN-1 through CN-N is no longer included in computing nodes CN-1 through CN-N (e.g., the particular computing node may be down, may be offline, may be unavailable, and/or the like) based on no longer receiving a heartbeat message from the particular computing node, based on information in a heartbeat message from the particular computing node, and/or the like.

Additionally, or alternatively, and as another example, computing nodes CN-1 through CN-N may determine that a particular computing node has been added to computing nodes CN-1 through CN-N based on receiving a new heartbeat message from the particular computing node, based on information included in a heartbeat message from the particular computing node, and/or the like. Additionally, or alternatively, and as another example, computing nodes CN-1 through CN-N may determine whether a threshold amount of time has elapsed since receiving a heartbeat message from a particular computing node, from a particular time at which the particular computing node should have published a heartbeat message (e.g., based on the respective clocks), and/or the like.

In some implementations, a particular computing node may determine that the particular computing node is no longer included in computing nodes CN-1 through CN-N based on no longer receiving respective heartbeat messages from other computing nodes of computing nodes CN-1 through CN-N, based on no longer being subscribed to the message stream of the message broker, and/or the like. Conversely, in some implementations, a particular computing node may determine that the particular computing node has been added to computing nodes CN-1 through CN-N based on receiving respective heartbeat messages from other computing nodes of computing nodes CN-1 through CN-N, based on being subscribed to a message stream of the message broker, and/or the like.

As shown by reference numbers 120, computing nodes CN-1 through CN-N may determine an order for the respective heartbeat messages exchanged among computing nodes CN-1 through CN-N. For example, computing nodes CN-1 through CN-N may determine an order in which computing nodes CN-1 through CN-N sent respective heartbeat messages to the message broker, an order in which the respective heartbeat messages were published to the message stream (e.g., by the message broker), and/or the like (e.g., using respective timestamps for the respective heartbeat messages). Continuing with the previous example, computing nodes CN-1 through CN-N may determine that heartbeat message M2 (from a hypothetical computing node CN-2) was sent before heartbeat message M1 (from computing node CN-1) which was sent before heartbeat message M3 (from a hypothetical computing node CN-3), and so forth.

In some implementations, computing nodes CN-1 through CN-N may determine the order relative to a time at which respective clocks for computing nodes CN-1 through CN-N would have triggered computing nodes CN-1 through CN-N to send, publish, and/or the like the respective heartbeat messages. In other words, computing nodes CN-1 through CN-N may determine an order based on respective amounts of delay between when computing nodes CN-1 through CN-N would have been triggered to send, publish, and/or the like the respective heartbeat messages and when computing nodes CN-1 through CN-N actually sent, published, and/or the like the respective heartbeat messages. In some implementations, the respective amounts of delay may indicate a computing load on computing nodes CN-1 through CN-N, a quantity of jobs being performed by computing nodes CN-1 through CN-N, and/or the like.

In some implementations, computing nodes CN-1 through CN-N may determine the order of the respective heartbeat messages. Alternatively, a single computing node of computing nodes CN-1 through CN-N may determine the order and may provide information identifying the order to other computing nodes of computing nodes CN-1 through CN-N. Additionally, or alternatively, the message broker may determine the order and may provide information identifying the order to computing nodes CN-1 through CN-N.

In some implementations, computing nodes CN-1 through CN-N may identify a heartbeat message, of the heartbeat messages, with a lowest offset relative to other heartbeat messages of the heartbeat messages. For example, an offset may be a difference between a time when a computing node is triggered to send a heartbeat message based on a clock associated with the computing node and a time when the computing node sends the heartbeat message. In some implementations, the offset may indicate an amount of computing resources associated with the computing node being consumed, a speed at which the computing node is performing actions, and/or the like. For example, a longer relative offset may indicate that a higher relative amount of computing resources of the computing node is being consumed, that the computing node is performing actions at a slower relative speed, and/or the like. In this way, by identifying the heartbeat message associated with a lowest relative offset, computing nodes CN-1 through CN-N can identify a computing node that has the highest amount of computing resources available for processing a set of jobs, that is capable of performing tasks at a faster relative speed, and/or the like.

In some implementations, the offset may indicate an order for the respective heartbeat messages. For example, a lower relative offset for a heartbeat message may indicate that the heartbeat message was sent before another heartbeat message associated with a higher relative offset. In some implementations, the message broker may determine the offset or another identifier and may configure heartbeat messages with information that identifies the offset and/or the other identifier.

In some implementations, computing nodes CN-1 through CN-N may store the respective heartbeat messages and/or information identifying the order of the respective heartbeat messages (or offsets of the respective heartbeat messages) in temporary memory resources. For example, the temporary memory resources may be automatically cleared at an interval, after a threshold amount of time, when new respective heartbeat messages are received, and/or the like. In some implementations, computing nodes CN-1 through CN-N may determine the order (or identify a heartbeat message with the lowest relative offset) and/or may store the respective heartbeat messages after determining that a particular computing node is no longer included in computing nodes CN-1 through CN-N, when a computing node has been added to computing nodes CN-1 through CN-N, when a quantity of computing nodes included in computing nodes CN-1 through CN-N satisfies a threshold, when a quantity of jobs in a queue satisfies a threshold, and/or the like. This conserves processing resources of computing nodes CN-1 through CN-N by reducing or eliminating a need for computing nodes CN-1 through CN-N to determine the order (or identify a heartbeat message with the lowest relative offset) when respective heartbeat messages are received regardless of whether a computing node has been added to or removed from computing nodes CN-1 through CN-N. In addition, this conserves memory resources of computing nodes CN-1 through CN-N by reducing or eliminating a need to store the respective heartbeat messages and/or information identifying the order (or offsets) of the respective heartbeat messages each time respective heartbeat messages are received.

As shown by reference numbers 130, computing nodes CN-1 through CN-N may provide information related to one or more factors associated with computing nodes CN-1 through CN-N, the respective heartbeat messages, and/or the like to the scheduler. For example, computing nodes CN-1 through CN-N may provide information identifying the order (or offsets) of the respective heartbeat messages, information identifying a respective computing load of computing nodes CN-1 through CN-N, a respective quantity of jobs being performed by computing nodes CN-1 through CN-N, a respective version of software and/or hardware of computing nodes CN-1 through CN-N, a respective quantity of micro-services for which computing nodes CN-1 through CN-N are performing jobs, and/or the like. In some implementations, computing nodes CN-1 through CN-N may provide the information after determining the order (or offsets) of the respective heartbeat messages, based on receiving input to provide the information, at a particular time, and/or the like. In some implementations, a single computing node of computing nodes CN-1 through CN-N may provide the information to the scheduler. This conserves processing resources of the scheduler by reducing a quantity of copies of the information that the scheduler receives. In addition, this conserves processing resources that would otherwise be consumed by multiple computing nodes of computing nodes CN-1 through CN-N providing the information to the scheduler.

As shown by reference number 140, the scheduler may determine a prioritization of computing nodes CN-1 through CN-N (e.g., based on the one or more factors). For example, the prioritization may be used to assign jobs to various computing nodes, as described in more detail elsewhere herein. In some implementations, the scheduler may determine a respective score for computing nodes CN-1 through CN-N (e.g., where the respective scores indicate a relative prioritization of computing nodes CN-1 through CN-N). In some implementations, the score may be an overall score that is based on individual scores for individual factors (e.g., where the individual scores are weighted differently, are averaged, are summed, are processed using a function, and/or the like to generate the overall score). Additionally, or alternatively, the scheduler may use a model that has been trained on a training set of data that includes scores for corresponding factors and/or combinations of factors for computing nodes to determine the respective scores. In this way, the scheduler may use artificial intelligence and/or machine learning to determine respective scores for computing nodes. Assume for example, and as shown by reference number 150, the scheduler identifies computing node CN-1 as having a first priority (even though heartbeat message M1, corresponding to computing node CN-1, did not have the first order relative to other heartbeat messages), computing node CN-2 as having a second priority, computing node CN-3 as having a third priority, and so forth.

In some implementations, the scheduler may determine a prioritization based on offsets associated with the respective heartbeat messages. For example, a computing node that sent the heartbeat message associated with the lowest relative offset may receive the highest prioritization relative to other computing nodes. Additionally, or alternatively, the scheduler may identify the computing node that sent the heartbeat message associated with the lowest relative offset as the computing node to perform an action rather than determining a prioritization of all of computing nodes CN-1 through CN-N. This conserves computing resources of the scheduler by reducing or eliminating a need for the scheduler to determine a prioritization of computing nodes CN-1 through CN-N.

As shown by reference number 160, the scheduler may store information that identifies a job queue of jobs to be completed (e.g., job J1, job J2, job J3, etc.). In some implementations, the jobs in the job queue may be ordered based on a priority of the jobs that the scheduler determined (e.g., the priority may be based on one or more factors related to the jobs). For example, factors related to a job may include an amount of time the job has been in the queue, an amount of computing resources the job may consume (e.g., as determined based on pre-programed information associated with the job, previous completions of the same job, and/or the like), a pre-programmed priority for the job, an order in which the jobs need to be completed to successfully generate output from a micro-service, and/or the like.

As shown by reference number 170, the scheduler may assign one or more of the jobs in the job queue to one or more of the computing nodes in computing nodes CN-1 through CN-N. In some implementations, the scheduler may assign jobs in order of the priority (e.g., from highest priority to lowest priority, from lowest priority to highest priority, and/or the like), such as where a first job is assigned to a first computing node with a first priority, a second job is assigned to a second computing node with a second priority, and so forth. Additionally, or alternatively, the scheduler may assign a largest portion of a plurality of jobs to a computing node with a first priority (e.g., the highest priority), a next largest portion to a computing node with a second priority (e.g., the next highest priority), and so forth. Additionally, or alternatively, the scheduler may just assign a first job to a computing node with the highest priority and may not assign jobs to other computing nodes until the prioritization is re-determined based on additional respective heartbeat messages from computing nodes CN-1 through CN-N. Additionally, or alternatively, the scheduler may assign jobs to computing nodes associated with a score that satisfies a threshold.

Additionally, or alternatively, the scheduler may assign a highest priority job to the computing node that sent the heartbeat message associated with the lowest relative offset. Additionally, or alternatively, when computing nodes CN-1 through CN-N implement an instance of the scheduler, a computing node may determine whether to perform a job (e.g., a job with the highest priority) based on whether the computing node sent the heartbeat message with the lowest relative offset. For example, the computing node may determine to perform a job based on determining that the computing node sent the heartbeat message associated with the lowest relative offset. Conversely, and as another example, the computing node may determine to not perform the job based on determining that the computing node did not send the heartbeat message associated with the lowest relative offset. As shown by reference numbers 180, the scheduler may provide, to computing nodes CN-1 through CN-N, information that identifies which computing nodes of computing nodes CN-1 through CN-N have been assigned particular jobs.

In some implementations, the message broker, computing nodes CN-1 through CN-N, and/or the scheduler may perform one or more actions after the scheduler has assigned the jobs from the job queue. For example, computing nodes CN-1 through CN-N may complete respective assigned jobs and/or may provide, to the message broker, information identifying the respective assigned jobs (e.g., to notify other computing nodes of CN-1 through CN-N of the respective assigned jobs). This reduces or eliminates duplicative completion of a job, thereby conserving processing resources that would otherwise be consumed by duplicate completion of a job. Additionally, or alternatively, and as another example, computing nodes CN-1 through CN-N may generate a status report related to the jobs being completed by computing nodes CN-1 through CN-N (e.g., a report that identifies jobs to be completed, whether the jobs have been completed, an amount of time for each job to be completed, and/or the like) and may output the report for display via a display of a user deice.

Additionally, or alternatively, and as another example, the scheduler may generate a report that identifies a priority of computing nodes CN-1 through CN-N and may output the report for display. Additionally, or alternatively, and as another example, the message broker may trigger an alarm when a computing node is no longer included in computing nodes CN-1 through CN-N or when a computing node has been added to computing nodes CN-1 through CN-N. Additionally, or alternatively, and as another example, computing nodes CN-1 through CN-N may perform analytics on completion of jobs (e.g., respective quantities of jobs completed by computing nodes CN-1 through CN-N, respective amounts of computing resources consumed completing the jobs, and/or the like).

In some implementations, the message broker, computing nodes CN-1 through CN-N, and/or the scheduler may reperform these functions at an interval. For example, computing nodes CN-1 through CN-N may exchange heartbeat messages at an interval via the message broker, and the scheduler may determine a priority for computing nodes CN-1 through CN-N and may assign jobs to computing nodes CN-1 through CN-N based on the priority. This facilitates dynamic, real-time determination of a priority of jobs and assignment of those jobs.

In this way, computing nodes may dynamically determine a priority of the computing nodes for completion of jobs based on one or more factors. This optimizes assignment of the jobs to minimize consumption of computing resources related to completion of the jobs, to reduce or eliminate overloading of the computing nodes, and/or the like. In addition, this facilitates dynamic real-time (or near real-time) job assignment, thereby improving job assignment. Further, this reduces or eliminates duplicative job completion, thereby conserving processing resources of computing nodes and/or network resources that would otherwise be consumed outputting a result of the job.

As indicated above, FIG. 1 is provided merely as an example. Other examples are possible and may differ from what was described with regard to FIG. 1.

Figure 2:
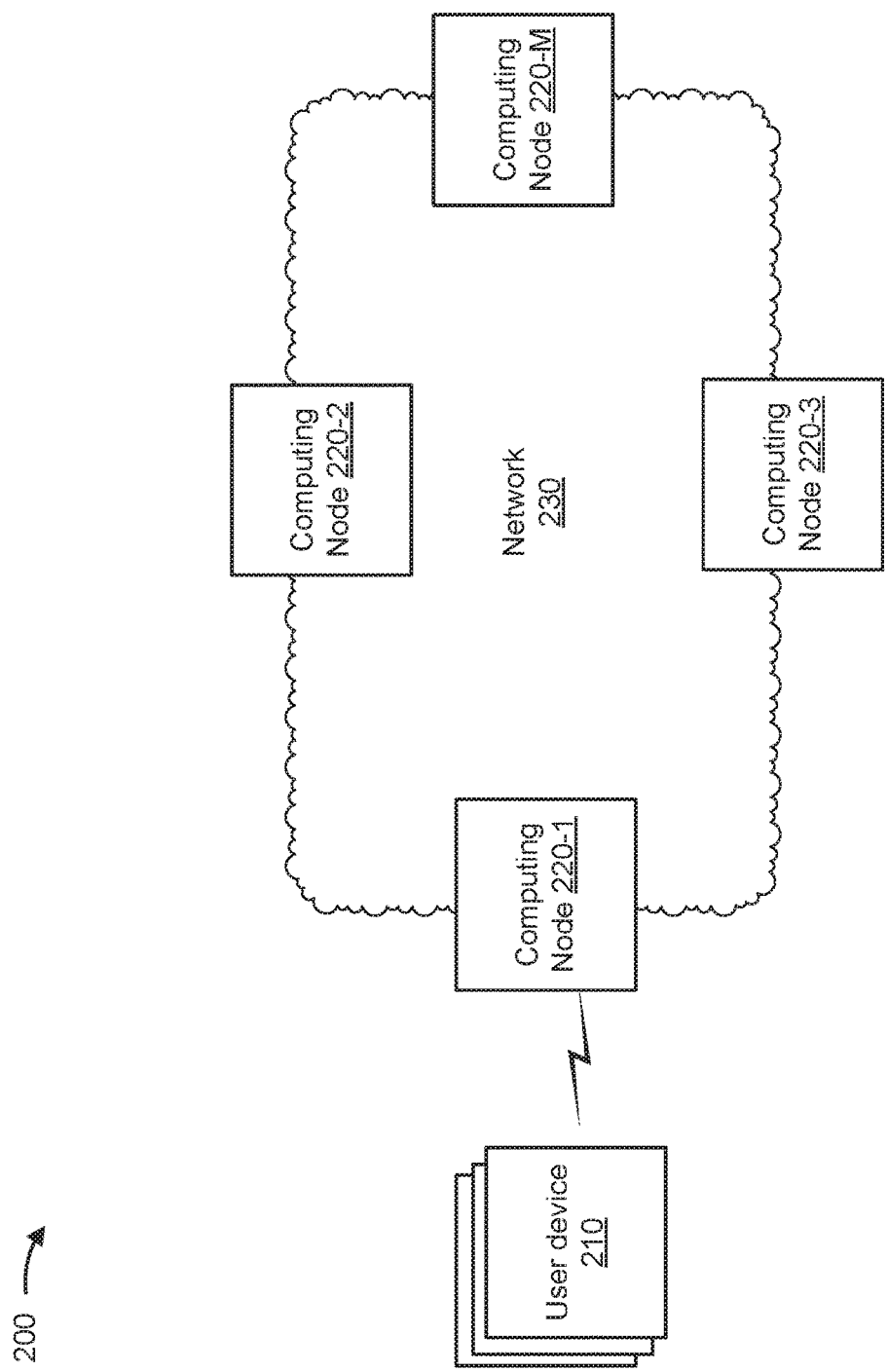
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a set of user devices 210 (referred to collectively as "user devices 210" and individually as "user device 210"), computing nodes 220-1 through 220-M (M≥1) (referred to collectively as "computing nodes 220" and individually as "computing node 220"), and a network 230. Devices of environment 200 may interconnect via wired connections, wireless connections, or a combination of wired and wireless connections.

User device 210 includes one or more devices capable of receiving, generating, storing, processing, and/or providing information associated with assigning a set of jobs related to a set of micro-services among computing nodes 220. For example, user device 210 may include a desktop computer, a mobile phone (e.g., a smart phone, a radiotelephone, and/or the like), a laptop computer, a tablet computer, a handheld computer, a gaming device, a virtual reality device, a wearable communication device (e.g., a smart wristwatch, a pair of smart eyeglasses, and/or the like), or a similar type of device. In some implementations, user device 210 may receive, and output for display, information related to assignment of a set of jobs among computing nodes 220, as described elsewhere herein.

Computing node 220 includes one or more devices capable of receiving, generating, storing, processing, and/or providing information related to assignment of a set of jobs to computing nodes 220. For example, computing node 220 may include one or more personal computers, workstation computers, server devices, or another type of computation and/or communication device. In some implementations, computing node 220 may be a physical device implemented within a housing, such as a chassis. In some implementations, computing node 220 may be a virtual device implemented by one or more computer devices of a cloud computing environment or a data center. In some implementations, computing node 220 may be associated with an application and/or a micro-service, as described elsewhere herein. Additionally, or alternatively, computing node 220 may determine a manner in which to assign a set of jobs, related to a micro-service, to one or more computing nodes 220, as described elsewhere herein.

In some implementations, computing node 220 may include a scheduler. For example, the scheduler may determine a prioritization of a set of computing nodes 220 and/or may assign jobs to the set of computing nodes 220, as described elsewhere herein. Additionally, or alternatively, computing node 220 may include a message broker. For example, the message broker may facilitate communications between computing node 220 and one or more other computing nodes 220, as described elsewhere herein. In some implementations, the scheduler and/or the message broker may be separate devices from computing node 220 (e.g., separate physical devices or separate virtual devices).

Network 230 includes one or more wired and/or wireless networks. For example, network 230 may include a cellular network (e.g., a long-term evolution (LTE) network, a code division multiple access (CDMA) network, a 3G network, a 4G network, a 5G network, or another type of cellular network), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
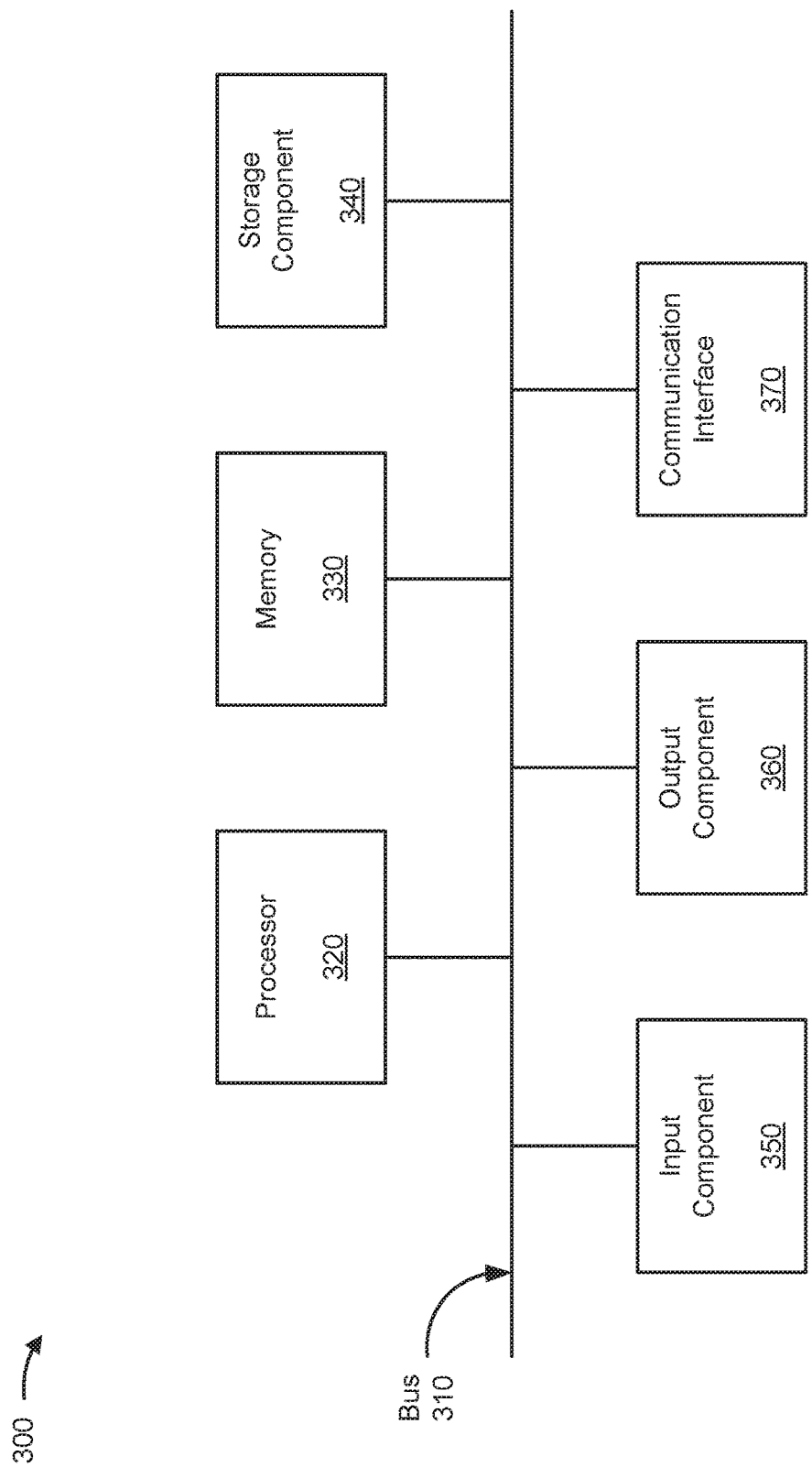
FIG. 3 is a diagram of example components of one or more devices of FIG. 2.

FIG. 3 is a diagram of example components of a device 300. Device 300 may correspond to user device 210 and/or computing node 220. In some implementations, user device 210 and/or computing node 220 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for dynamic micro-services related job assignment. In some implementations, one or more process blocks of FIG. 4 may be performed by a computing node (e.g., computing node 220, a scheduler associated with computing node 220, a message broker associated with computing node 220, and/or the like). In some implementations, one or more process blocks of FIG. 4 may be performed by another device or a group of devices separate from or including the computing node, such as a user device (e.g., user device 210).

As shown in FIG. 4, process 400 may include receiving, from a set of computing nodes, a set of heartbeat messages related to determining a respective priority of the set of computing nodes for processing a set of jobs (block 410). For example, the computing node (e.g., computing node 220, using processor 320, input component 350, communication interface 370, and/or the like) may receive, from a set of computing nodes, a set of heartbeat messages related to determining a respective priority of the set of computing nodes for processing a set of jobs. In some implementations, the computing node may receive a set of heartbeat messages in a manner that is the same as or similar to that described with regard to FIG. 1. For example, the computing node may receive a set of heartbeat messages from a message broker.

As further shown in FIG. 4, process 400 may include determining an order in which the set of heartbeat messages was sent (block 420). For example, the computing node (e.g., computing node 220, using processor 320, and/or the like) may determine an order in which the set of heartbeat messages was sent. In some implementations, the computing node may determine an order in a manner that is the same as or similar to that described with regard to FIG. 1. For example, the computing node may determine an order based on respective delays between when the set of computing nodes would have been triggered to send the set of heartbeat messages and when the set of computing nodes actually sent the set of heartbeat messages.

In some implementations, the computing node may identify a heartbeat message, of the set of heartbeat messages, associated with a lowest offset relative to offsets associated with other heartbeat messages of the set of heartbeat messages. For example, the computing node may identify the heartbeat message associated with the lowest offset in a manner that is the same as or similar to that described with regard to FIG. 1.

As further shown in FIG. 4, process 400 may include determining the respective priority of the set of computing nodes based on one or more factors (block 430). For example, the computing node (e.g., computing node 220, using processor 320, and/or the like), may determine the respective priority of the set of computing nodes based on one or more factors. In some implementations, the computing node may determine the respective priority in a manner that is the same as or similar to that described with regard to FIG. 1. For example, the computing node may determine the respective priority based on one or more factors related to the set of messages and/or the set of computing nodes, such as an order in which the set of heartbeat messages was sent, respective amounts of computing resources being used by the set of computing nodes, and/or the like.

As further shown in FIG. 4, process 400 may include identifying a particular computing node, of the set of computing nodes, that is to perform a subset of the set of jobs based on the respective priority of the set of computing nodes (block 440). For example, the computing node (e.g., computing node 220, using processor 320, and/or the like) may identify a particular computing node, of the set of computing nodes, that is to perform a subset of the set of jobs based on the respective priority of the set of computing nodes. In some implementations, the computing node may identify a particular computing node in a manner that is the same as or similar to that described with regard to FIG. 1. For example, the computing node may identify a particular computing node that has the highest priority relative to other computing nodes of the set of computing nodes.

In some implementations, the computing node may determine whether to perform a subset of the set of jobs (e.g., based on the respective priority of the set of computing nodes, based on whether the computing node sent the heartbeat message associated with the lowest offset, etc.). For example, the computing node may determine whether to perform the subset of the set of jobs in a manner that is the same as or similar to that described with regard to FIG. 1.

As further shown in FIG. 4, process 400 may include performing a set of actions after identifying the particular computing node that is to perform the subset of jobs (block 450). For example, the computing node (e.g., computing node 220, using processor 320, and/or the like) may perform a set of actions after identifying the particular computing node that is to perform the subset of jobs. In some implementations, the computing node may perform a set of actions in a manner that is the same as or similar to that described with regard to FIG. 1. For example, the computing node may perform a job and/or another action related to performing a job.

In some implementations, the computing node may perform a set of actions after determining whether to perform the subset of the set of jobs (e.g., after determining whether the computing node sent the heartbeat message associated with the lowest offset). For example, the computing node may perform the set of actions in a manner that is the same as or similar to that described with regard to FIG. 1.

Process 400 may include additional implementations, such as any single implementation or any combination of implementations described below.

In some implementations, the one or more factors may include the order in which the set of heartbeat messages was sent, a respective version of software installed on the set of computing nodes, a respective computing resource utilization of the set of computing nodes, and/or a respective offset associated with the set of heartbeat messages (e.g., which computing node sent the heartbeat message associated with the lowest offset, whether an offset is lower relative to other offsets, etc.). In some implementations, the computing node may store the set of heartbeat messages in temporary memory resources associated with the computing node after receiving the set of heartbeat messages. In some implementations, the computing node may determine that another computing node has been added to the set of computing nodes based on the set of heartbeat messages and may store the set of heartbeat messages after determining that the other computing node has been added to the set of computing nodes. In some implementations, the computing node may determine that another computing node, of the set of computing nodes, is no longer included in the set of computing nodes based on the set of heartbeat messages and may store the set of heartbeat messages after determining that the other computing node is no longer included in the set of computing nodes. In some implementations, the computing node may delete the set of heartbeat messages from the temporary memory resources after identifying the particular computing node and/or after determining whether to perform the subset of the set of jobs.

In some implementations, the computing node may determine that a threshold amount of time has elapsed since a message was received from another computing node of the set of computing nodes and may determine the order in which the set of heartbeat messages was sent and/or may identify the heartbeat message associated with the lowest offset after determining that the threshold amount of time has elapsed. In some implementations, the computing node may determine a respective time of receipt for the set of heartbeat messages relative to each other based on a respective timestamp associated with the set of heartbeat messages (e.g., where the respective timestamp is determined using a clock associated with the computing node and/or where the set of computing nodes were triggered to send the set of heartbeat messages at a same time) and may determine the order in which the set of heartbeat messages was sent and/or may identify the heartbeat message associated with the lowest offset based on the respective time of receipt for the set of heartbeat messages.

In some implementations, the computing node may determine that a first computing node has been added to the set of computing nodes based on the set of heartbeat messages, or may determine that a second computing node, of the set of computing nodes, is no longer included in the set of computing nodes based on the set of heartbeat messages may determine the order in which the set of heartbeat messages was sent and/or may identify the heartbeat message associated with the lowest offset after determining that the first computing node has been added to the set of computing nodes or determining that the second computing node is no longer included in the set of computing nodes. In some implementations, the computing node may determine that a first message, of the set of heartbeat messages, was sent prior to a second message of the set of heartbeat messages (e.g., where the first message is associated with a first computing node of the set of computing nodes and/or where the second message is associated with a second computing node of the set of computing nodes) and may determine a first priority for the first computing node and a second priority for the second computing node based on the first message having been sent prior to the second message (e.g., where the first priority is a higher priority relative to the second priority).

In some implementations, the computing node may determine that a first message, of the set of heartbeat messages, was sent prior to a second message of the set of heartbeat messages (e.g., where the first message is associated with a first computing node of the set of computing nodes and/or where the second message is associated with a second computing node of the set of computing nodes) and may determine a first priority for the first computing node and a second priority for the second computing node based on the one or more factors (e.g., where the first priority is a lower priority relative to the second priority).

In some implementations, the computing node may determine a respective score for the set of computing nodes and may determine the respective priority for the set of computing nodes based on the respective score for the set of computing nodes. In some implementations, the computing node may determine a respective score for the set of computing nodes based on the one or more factors related to the set of computing nodes, and may determine the respective priority of the set of computing nodes based on the respective score for the set of computing nodes. In some implementations, the computing node may determine a respective time of transmission, relative to a particular time, for the set of heartbeat messages based on respective timestamps associated with the set of heartbeat messages and may determine the respective priority of the set of computing nodes based on the respective time of transmission for the set of heartbeat messages.

In some implementations, the computing node may identify a first computing node, of the set of computing nodes, that is to perform a first subset of the set of jobs, and may identify a second computing node, of the set of computing nodes, that is to perform a second subset of the set of jobs (e.g., where the first computing node has a higher priority relative to the second computing node and/or where the first subset of the set of jobs has a higher priority relative to the second subset of the set of jobs). In some implementations, the computing node may determine that the computing node is to perform the subset of the set of jobs based on having a highest priority relative to other respective priorities of other computing nodes of the set of computing nodes.

In some implementations, the computing node may receive an additional set of heartbeat messages from the set of computing nodes and may determine another particular computing node, of the set of computing nodes, to perform another subset of the set of jobs (e.g., where the other particular computing node and the particular computing node are different and/or where the other subset of the set of jobs and the subset of the set of jobs are different). In some implementations, the computing node may receive an additional set of heartbeat messages from the set of computing nodes and may determine whether to perform another subset of the set of jobs (e.g., where the other subset of the set of jobs and the subset of the set of jobs are different).

In some implementations, the computing node may perform the subset of the set of jobs after identifying the particular computing node (e.g., where the computing node is the particular computing node) and/or after determining whether to perform the subset of the set of jobs. In some implementations, the computing node may receive another set of heartbeat messages from the set of computing nodes and may re-determine the respective priority of the set of computing nodes based on the other set of heartbeat messages. In some implementations, the computing node may process the subset of the set of jobs after identifying the particular computing node that is to perform the subset of the set of jobs and/or after determining whether the computing node is to perform the subset of the set of jobs. In some implementations, the computing node may assign a job, of the set of jobs, to the particular computing node after identifying the particular computing node (e.g., where the job has a highest priority relative to other jobs of the set of jobs). In some implementations, the computing node may assign a job, of the set of jobs, to the computing node after determining whether the computing node is to perform the subset of the set of jobs (e.g., where the job has a highest priority relative to other jobs of the set of jobs). In some implementations, the computing node may generate a report related to the set of jobs or the set of computing nodes and may output the report for display via a display of a device.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

In this way, computing node 220 may dynamically determine whether to perform a job related to a micro-service in a manner that is consistent with other computing nodes 220. This conserves processing resources of computing nodes 220 by reducing or eliminating duplicative performance of the job. In addition, this provides an efficient way to determine which computing nodes 220 are to perform particular jobs, thereby improving assignment of a set of jobs to computing nodes 220. Further, this reduces or eliminates a need for a particular device to assign the set of jobs to computing nodes 220, thereby simplifying a network architecture related to assigning a set of jobs to computing nodes 220.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, and/or the like), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
    subscribing, by a computing node, to a message broker associated with a set of heartbeat messages,
        wherein a set of computing nodes subscribe to the message broker;
    receiving, by the computing node and from the set of computing nodes, the set of heartbeat messages,
        wherein each computing node, of the set of computing nodes, is configured to receive the set of heartbeat messages based upon being subscribed to the message broker, and
        wherein the set of heartbeat messages is related to determining a respective priority of the set of computing nodes for processing a set of jobs;
    determining, by the computing node, an order of the set of heartbeat messages based on respective delays between when the set of computing nodes would have been triggered to send the set of heartbeat messages and when the set of computing nodes actually sent the set of heartbeat messages;

determining, by the computing node, the respective priority of the set of computing nodes based on one or more factors related to at least one of the set of computing nodes or the order of the set of heartbeat messages;

determining, by the computing node, whether to perform a subset of the set of jobs based on the respective priority of the set of computing nodes; and performing, by the computing node, a set of actions after determining whether to perform the subset of the set of jobs.

2. The method of claim 1, wherein the one or more factors include:

a respective offset associated with the set of heartbeat messages, a respective version of software installed on the set of computing nodes, and a respective computing resource utilization of the set of computing nodes.

3. The method of claim 1, further comprising:

assigning a largest portion of the set of jobs to a first computing node with a first priority; and assigning a next largest portion of the set of jobs to a second computing node with a second priority.

4. The method of claim 1, further comprising:

determining that a threshold amount of time has elapsed since a message was received from another computing node of the set of computing nodes;

wherein determining the order of the of heartbeat messages comprises:

determining the order of the set of heartbeat messages after determining that the threshold amount of time has elapsed.

5. The method of claim 1, further comprising:

determining a respective time of receipt for the set of heartbeat messages relative to each other based on a respective timestamp associated with the set of heartbeat messages, wherein the respective timestamp is determined using a clock associated with the computing node, wherein the set of computing nodes are triggered to send the set of heartbeat messages at a same time; and wherein determining the order of the set of heartbeat messages comprises:

determining the order of the set of heartbeat messages based on the respective time of receipt for the set of heartbeat messages.

6. The method of claim 1, wherein performing the set of actions comprises:

receiving an additional set of heartbeat messages from the set of computing nodes; and determining whether to perform another subset of the set of jobs, wherein the other subset of the set of jobs and the subset of the set of jobs are different.

7. The method of claim 1, further comprising:

identifying, by the computing node and based on the respective priority of the set of computing nodes, a particular computing node, of the set of computing nodes, that is to perform the subset of the set of jobs.

8. A device, comprising:

a memory; and one or more processors operatively coupled to the memory, the memory and the one or more processors configured to:

subscribe, by a computing node, to a message broker associated with a set of heartbeat messages, wherein a set of computing nodes subscribe to the message broker;

receive, by the computing node and from the set of computing nodes, the set of heartbeat messages, wherein each computing node, of the set of computing nodes, is configured to receive the set of heartbeat messages based upon being subscribed to the message broker;

determine, by the computing node, an order of the set of heartbeat messages based on respective delays between when the set of computing nodes would have been triggered to send the set of heartbeat messages and when the set of computing nodes actually sent the set of heartbeat messages;

determine, by the computing node, a respective priority of the set of computing nodes for a set of jobs, wherein the respective priority is based on one or more factors related to at least one of the set of computing nodes or the order of the set of heartbeat messages;

determine, by the computing node, whether to perform a subset of the set of jobs based on the respective priority of the set of computing nodes; and perform, by the computing node, a set of actions after determining whether to perform the subset of the set of jobs.

9. The device of claim 8, wherein the one or more processors are further configured to:

store the set of heartbeat messages in temporary memory resources associated with the computing node after receiving the set of heartbeat messages; and delete the set of heartbeat messages from the temporary memory resources after determining whether to perform the subset of the set of jobs.

10. The device of claim 9, wherein the one or more processors are further configured to:

determine that another computing node has been added to the set of computing nodes based on the set of heartbeat messages; and wherein the one or more processors, when storing the set of heartbeat messages, are configured to:

store the set of heartbeat messages after determining that the other computing node has been added to the set of computing nodes.

11. The device of claim 8, wherein the one or more processors are further configured to:

determine that a threshold amount of time has elapsed since a message was received from another computing node of the set of computing nodes;

wherein the one or more processors, when determining the order of the set of heartbeat messages, are further to:

determine the order of the set of heartbeat messages after determining that the threshold amount of time has elapsed.

12. The device of claim 8, wherein the one or more processors are further configured to:

determine a respective time of receipt for the set of heartbeat messages relative to each other based on a respective timestamp associated with the set of heartbeat messages, wherein the respective timestamp is determined using a clock associated with the computing node, wherein the set of computing nodes are triggered to send the set of heartbeat messages at a same time; and wherein the one or more processors, when determining the order of the set of heartbeat messages, are further to:
   determine the order of the set of heartbeat messages based on the respective time of receipt for the set of heartbeat messages.

13. The device of claim 8, wherein the one or more processors, when performing the set of actions, are further to:
   receive an additional set of heartbeat messages from the set of computing nodes; and
   determine whether to perform another subset of the set of jobs,
      wherein the other subset of the set of jobs and the subset of the set of jobs are different.

14. The device of claim 8, wherein the one or more processors are further configured to:
   identify, by the computing node and based on the respective priority of the set of computing nodes, a particular computing node, of the set of computing nodes, that is to perform the subset of the set of jobs.

15. A non-transitory computer-readable medium storing one or more instructions for wireless communication, the one or more instructions comprising:
   one or more instructions that, when executed by one or more processors of a device, cause the one or more processors to:
      subscribe, by a computing node, to a message broker associated with a set of heartbeat messages,
         wherein a set of computing nodes subscribe to the message broker;
      receive, by the computing node and from the set of computing nodes, the set of heartbeat messages,
         wherein each computing node, of the set of computing nodes, is configured to receive the set of heartbeat messages based upon being subscribed to the message broker;
      determine, by the computing node, an order of the set of heartbeat messages based on respective delays between when the set of computing nodes would have been triggered to send the set of heartbeat messages and when the set of computing nodes actually sent the set of heartbeat messages;
      determine, by the computing node, a respective priority of the set of computing nodes for a set of jobs based on one or more factors related to at least one of the set of computing nodes or the order of the set of heartbeat messages;
      determine, by the computing node, whether to perform a subset of the set of jobs based on the respective priority of the set of computing nodes; and
      perform, by the computing node, a set of actions after determining whether to perform the subset of the set of jobs.

16. The non-transitory computer-readable medium of claim 15, wherein the one or more factors include:
   a respective offset associated with the set of heartbeat messages,
   a respective version of software installed on the set of computing nodes, and
   a respective computing resource utilization of the set of computing nodes.

17. The non-transitory computer-readable medium of claim 15, wherein the one or more instructions, when executed by the one or more processors, further cause the one or more processors to:
   determine a respective score for the set of computing nodes based on the one or more factors related to the set of computing nodes; and
   wherein the one or more instructions, that cause the one or more processors to determine the respective priority for the set of computing nodes, cause the one or more processors to:
      determine the respective priority of the set of computing nodes based on the respective score for the set of computing nodes.

18. The non-transitory computer-readable medium of claim 15, wherein the one or more instructions, when executed by the one or more processors, further cause the one or more processors to:
   determine that a threshold amount of time has elapsed since a message was received from another computing node of the set of computing nodes;
   wherein the one or more instructions, that cause the one or more processors to determine the order of the set of heartbeat messages, cause the one or more processors to:
      determine the order of the set of heartbeat messages after determining that the threshold amount of time has elapsed.

19. The non-transitory computer-readable medium of claim 15, wherein the one or more instructions, when executed by the one or more processors, further cause the one or more processors to:
   determine a respective time of receipt for the set of heartbeat messages relative to each other based on a respective timestamp associated with the set of heartbeat messages,
   wherein the respective timestamp is determined using a clock associated with the computing node,
   wherein the set of computing nodes are triggered to send the set of heartbeat messages at a same time; and
   wherein the one or more instructions, that cause the one or more processors to determine the order of the set of heartbeat messages, cause the one or more processors to:
      determine the order of the set of heartbeat messages based on the respective time of receipt for the set of heartbeat messages.

20. The non-transitory computer-readable medium of claim 15, wherein the one or more instructions, that cause the one or more processors to perform the set of actions, cause the one or more processors to:
   receive an additional set of heartbeat messages from the set of computing nodes; and
   determine whether to perform another subset of the set of jobs,
      wherein the other subset of the set of jobs and the subset of the set of jobs are different.

\* \* \* \* \*